(No Model.)
H. J. KREBS.
PROCESS OF CIRCULATING LIQUEFIED REFRIGERATING AGENTS.
No. 436,003. Patented Sept. 9, 1890.
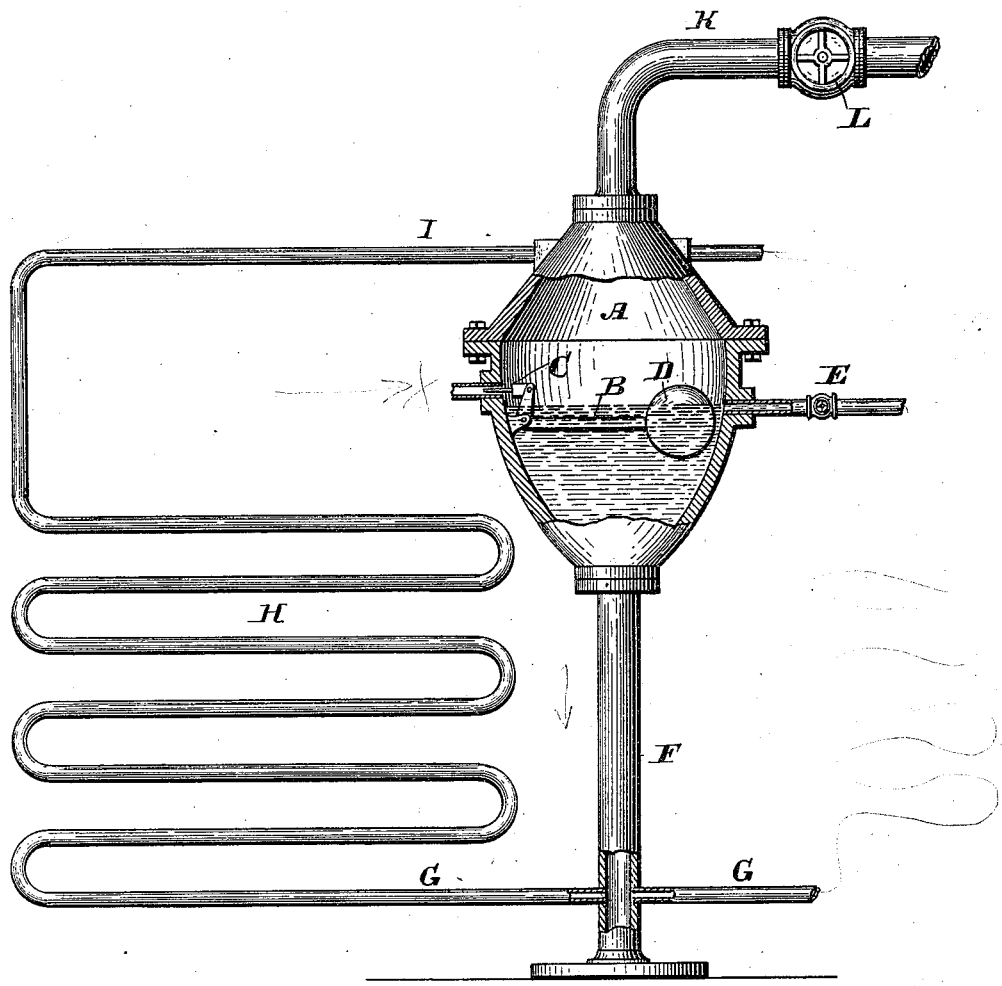
ATTEST.
J. Henry Kaiser
Jas W. Graham
INVENTOR.
H. Johs. Krebs.
by Geo. A. Sawyer.
Attorney.

UNITED STATES PATENT OFFICE.

HENRIK JOHANNES KREBS, OF WILMINGTON, DELAWARE.

PROCESS OF CIRCULATING LIQUEFIED REFRIGERATING AGENTS.

SPECIFICATION forming part of Letters Patent No. 436,003, dated September 9, 1890.

Application filed November 20, 1889. Serial No. 330,984. (No model.)

*To all whom it may concern:*

Be it known that I, HENRIK JOHANNES KREBS, a citizen of the United States, residing at Wilmington, in the county of New Castle and State of Delaware, have invented certain new and useful Improvements in Refrigerating Apparatus and the Mode of Circulating Liquefied Refrigerating Gases Therein; and I do hereby declare the following to be a full, clear, and exact description of the invention, such as will enable others skilled in the art to which it appertains to make and use the same, reference being also had to the accompanying drawing.

My invention relates especially to the mode of circulating liquid anhydrous ammonia and extracting heat from brine, air, water, or whatever is to be cooled, and the apparatus therefor. The system is equally well adapted to other systems of refrigeration besides ammonia; but to simplify the specification these will be left out of consideration, the *modus operandi* in each case being similar.

Liquid ammonia as at present used is ordinarily fed in a small stream through a feed-cock to a system of piping generally known to the trade as the "expansion-coil." These coils are of varying forms, according to the use, design, and circumstances, and varying with the ideas of purchasers and designers. Often they are not coils at all, but pipes of varying diameters in most cases make up the principal parts of the expansion-coils. In these nearly all the liquid ammonia is generally supposed to be evaporated and the ammonia as gas returned to the main leading to the compressor or absorber. In some instances liquid passing over is caught in traps, and upon exposure to higher pressure returned into circulation. Again, others choose to let returning liquid pass through the compression-pumps or absorber before being used. Both methods, especially the latter, appear to me objectionable, and it is next to impossible to regulate the flow of liquefied gas through the feed-cock to and through the above-mentioned expansion-coils, so as to insure that all the cooling-surfaces are doing full duty, and at the same time prevent some liquid passing right through. This has led to the use of excessive quantities of piping, so as to secure the return of fairly-dry gas. To overcome and remedy these defects has been the object of my invention, and this result I accomplish in the manner hereinafter described.

In the drawing, A represents a metallic vessel, (shown partly in elevation and partly in section,) which is charged with liquid anhydrous ammonia to a suitable level, as B. This level will vary some, but can be maintained within the necessary limits either through an automatic regulating-cock C, operated by the float D, or by means of an ordinary feed-cock E. This ammonia-vessel is somewhat elevated, as I make the ammonia leave the same by gravitation. Should mechanical means of discharge be resorted to, any level will do.

To the bottom of the vessel A is fitted a stand-pipe F of so large a diameter that the gas generated in it will not cause the pipe to lose its liquid ammonia. From near the bottom of this stand-pipe feed-pipes G G lead the ammonia to one or more expansion-coils H. These I place at a lower level than the vessel A, and they are of such a construction that the gas generated, together with some ungasified liquid, can readily pass on, discharging itself into the vessel A through the return-pipe I. The gas here separates from the liquid, the gas returning to the compressor or absorber through the pipe K, and the liquid, after mixing with that in the lower part of the vessel A, again returns to the expansion-coil H. Should the current of gas be so great as to cause some liquid to follow through K, a trap can be inserted, which effects a further separation, the liquid returning to A. The liquid enters the vessel A through the feed-cock, actuated by the pressure on receiver, which communicates with the condenser. In the vessel A it is relieved of the condenser-pressure through the pipe K and valve L. The pipe K is fitted with a cock or valve L, through the regulation of which the pressure in the vessel A can be increased at will above the pressure in the main leading to the absorber or compressor. Through the regulation of this pressure the temperature of the ammonia in the vessel A, and hence, also, in the expansion-coil H, can be raised or lowered at will. An indefinite number of such systems can be connected to the same pump or absorber, provided, of course, that their total capacity for evaporating does not exceed that of the pump or absorption-machine and condenser.

The great advantages of this system are, first, the possibility of flooding the whole expansion-coil with liquid anhydrous ammonia without returning liquid to pump or absorber; second, the lessened cost of the expansion-coils, as the greater efficiency renders it possible to reduce the piping very materially, and, third, the ease with which the temperature is changed in part of the system simply by regulating the pressure in the section you wish to affect.

Having thus described my invention, what I claim as new, and desire to secure by Letters Patent, is—

1. The process herein described of circulating a liquid volatile refrigerant, consisting in charging it into and circulating it from a receiving and discharging vessel and relieving the condensing-pressure therein, in the manner and for the purpose set forth.

2. The herein-described process of circulating a liquid volatile refrigerant, which consists in passing it from a low-pressure vessel through pipes or vessels in which the liquid is evaporated for refrigeration, and returning the gas and intermixed liquid to said low-pressure vessel and removing the gas therefrom to a compressor or absorber, in the manner and for the purpose set forth.

3. The process of circulating a liquid volatile refrigerant, which consists in charging it into and circulating it from a receiving and discharging low-pressure vessel through pipes or vessels, in which it is evaporated for refrigeration, and returning the contents of said pipes or vessels into the said low-pressure vessel, when the gas is removed, recondensed, and returned, in the manner set forth.

In testimony whereof I affix my signature in presence of two witnesses.

HENRIK JOHANNES KREBS.

Witnesses:
LOUIS WERLIM,
B. W. PAEHLER.